(12) United States Patent
He

(10) Patent No.: US 11,472,636 B2
(45) Date of Patent: Oct. 18, 2022

(54) TRANSFER DEVICE AND TRANSFER METHOD

(71) Applicant: HKC CORPORATION LIMITED, Guangdong (CN)

(72) Inventor: Huailiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 972 days.

(21) Appl. No.: 16/312,064

(22) PCT Filed: Sep. 7, 2018

(86) PCT No.: PCT/CN2018/104507
§ 371 (c)(1),
(2) Date: Dec. 20, 2018

(87) PCT Pub. No.: WO2019/174201
PCT Pub. Date: Sep. 19, 2019

(65) Prior Publication Data
US 2019/0315579 A1    Oct. 17, 2019

(30) Foreign Application Priority Data
Mar. 16, 2018    (CN) .......................... 201810220012.3

(51) Int. Cl.
*B65G 49/06*    (2006.01)
*B25J 9/16*     (2006.01)
(Continued)

(52) U.S. Cl.
CPC .......... *B65G 49/061* (2013.01); *B25J 9/1676* (2013.01); *B25J 15/0616* (2013.01); *B65G 43/08* (2013.01); *B65G 2203/042* (2013.01)

(58) Field of Classification Search
CPC combination set(s) only.
See application file for complete search history.

(56) References Cited

U.S. PATENT DOCUMENTS

| 3,860,125 A | 1/1975 | Johnson et al. |
| 2004/0225408 A1* | 11/2004 | Whitcomb ........ H01L 21/67265 700/213 |

(Continued)

FOREIGN PATENT DOCUMENTS

| CN | 101169528 A | 4/2008 |
| CN | 101458314 A | 6/2009 |

(Continued)

OTHER PUBLICATIONS

First Office Action in counterpart Chinese Application No. 201810220012.3, dated Mar. 1, 2019.
(Continued)

*Primary Examiner* — Kyle O Logan
(74) *Attorney, Agent, or Firm* — Westbridge IP LLC

(57) ABSTRACT

The present application provides a transfer device and a transfer method. The transfer device includes: a frame; a module transfer arm, arranged above the frame and with a number of at least one; a pre-inspection station, arranged on the frame at an initial placement position in a conveying direction of the module transfer arm, and configured to place thereon a target object to be inspected; a post-inspection station, arranged on the frame at a finish-placement position in the conveying direction of the module transfer arm, and configured to place thereon the target object after being inspected; an inspection station, respectively arranged on the frame and between the pre-inspection station and the post-inspection station, and configured to place thereon and inspect the target object; a feed mechanism.

19 Claims, 5 Drawing Sheets

(51) Int. Cl.
*B25J 15/06* (2006.01)
*B65G 43/08* (2006.01)

(56) References Cited

U.S. PATENT DOCUMENTS

| | | | | |
|---|---|---|---|---|
| 2012/0062259 | A1* | 3/2012 | Yamada | G01R 31/2887 |
| | | | | 324/750.25 |
| 2017/0157783 | A1* | 6/2017 | Ogawa | F16P 3/003 |
| 2018/0039191 | A1* | 2/2018 | Shibazaki | G03F 9/00 |
| 2019/0315579 | A1* | 10/2019 | He | B25J 15/0616 |
| 2021/0379763 | A1* | 12/2021 | Denenberg | B25J 9/1671 |
| 2021/0387224 | A1* | 12/2021 | Nakamura | H01L 21/6715 |

FOREIGN PATENT DOCUMENTS

| | | |
|---|---|---|
| CN | 102375253 A | 3/2012 |
| CN | 204074561 U | 1/2015 |
| CN | 104483765 A | 4/2015 |
| CN | 104493198 A | 4/2015 |
| CN | 206913143 U | 1/2018 |
| CN | 107678194 A | 2/2018 |
| CN | 206990465 U | 2/2018 |
| CN | 108423434 A | 8/2018 |
| JP | 2012255903 A | 12/2012 |

OTHER PUBLICATIONS

Second Office Action in counterpart Chinese Application No. 201810220012.3, dated Oct. 25, 2019.
Third Office Action in counterpart Chinese Application No. 201810220012.3, dated Jun. 3, 2020.
International Search Reported dated Nov. 29, 2018 for corresponding International Application No. PCT/CN2018/104507, filed Sep. 7, 2018.

* cited by examiner

TRANSFER DEVICE AND TRANSFER METHOD

CROSS-REFERENCE TO RELATED APPLICATIONS

This application is the International Application No. PCT/CN2018/104507 for entry into US national phase with an international filing date of Sep. 7, 2018, designating US, now pending, and claims priority to Chinese Patent Application No. 201810220012.3, filed on Mar. 16, 2018, the content of which is incorporated herein by reference in its entirety.

BACKGROUND OF THE INVENTION

Field of the Invention

The present application relates to the technical field of automatic conveying device, and more particularly to a transfer device and a transfer method based on the transfer device.

Description of Related Art

A conventional automatic transfer device for inspection of liquid crystal modules always chooses panels, which are configured to bear the liquid crystal modules, to be arranged at two sides of a liquid crystal module conveying passage. The liquid crystal modules are moved out of the conveying passage to be performed with inspection, and then moved into the conveying passage again after the inspection and transferred to a subsequent process. The inspection positions and the conveying positions between different inspection processes are separately arranged, such transfer device has complicate and time-consuming use process, large volume, high production cost, and is not apt to be arranged in a plant area.

BRIEF SUMMARY OF THE INVENTION

An object of the present application is to provide a transfer device and a transfer method, which aims at solving the problem that the conventional automatic transfer device for inspection of liquid crystal modules has complicate and time-consuming use process, large volume, high production cost, and is not apt to be arranged in a plant area.

In order to achieve the above object, technical solutions adopted by the present applications are as follows: a transfer device is provided, the transfer device, comprising:

a frame;

a module transfer arm, arranged above the frame and with a number of at least one;

a pre-inspection station, arranged on the frame at an initial placement position in a conveying direction of the module transfer arm, and configured to place thereon a target object to be inspected;

a post-inspection station, arranged on the frame at a finish-placement position in the conveying direction of the module transfer arm, and configured to place thereon the target object after being inspected;

an inspection station, respectively arranged on the frame and between the pre-inspection station and the post-inspection station, and configured to place thereon and inspect the target object;

a feed mechanism, in connection with the module transfer arm, and configured to transfer the target object from the pre-inspection station to the inspection station and to lift the target object to avoid inspectors through automatic operation or under the drive of the module transfer arm; and a discharge mechanism, in connection with the module transfer arm, and configured to transfer the target object from the inspection station to the post-inspection station and to lift the target object to avoid the inspectors through automatic operation or under the drive of the module transfer arm.

In one embodiment, the post-inspection station is located at an end of the module transfer arm.

In one embodiment, the number of the inspection station is at least eight and the inspection stations are evenly distributed at both sides of the module transfer arm.

In one embodiment, the number of the module transfer arm is two, and the two module transfer arms are juxtaposed.

In one embodiment, the feed mechanism and the discharge mechanism are both robotic arms.

In one embodiment, the robotic arm is provided with an anti-collision inspection member.

In one embodiment, the anti-collision inspection member is a distance inspection sensor.

In one embodiment, the robotic arm is provided with a holder configured to hold the target object.

In one embodiment, the holder is suction cups.

In one embodiment, the suction cups are fixed to the robotic arm via a fixing bracket.

In one embodiment, the suction cups are uniformly arranged on the fixing bracket.

In one embodiment, the transfer device further comprises a suction device configured to be in communication with the suction cups.

In one embodiment, the suction device is a vacuum pump.

In one embodiment, the vacuum pump and the suction cups are connected by a pipeline.

In one embodiment, the pipeline comprises hoses.

The present application further provides a transfer device, and the transfer device comprises:

a frame;

a module transfer arm, arranged above the frame and with a number of at least one set;

a pre-inspection station, arranged on the frame at an initial placement position in a conveying direction of the module transfer arm, and configured to place thereon a target object to be inspected;

a post-inspection station, arranged on the frame at a finish-placement position in the conveying direction of the module transfer arm, and configured to place thereon the target object after being inspected;

inspection stations, respectively arranged on the frame and between the pre-inspection station and the post-inspection station, and configured to place thereon and inspect the target object;

a feed mechanism, in connection with the module transfer arm, and configured to transfer the target object from the pre-inspection station to one of the inspection stations and to lift the target object to avoid inspectors through automatic operation or under the drive of the module transfer arm; and a discharge mechanism, in connection with the module transfer arm, and configured to transfer the target object from one of the inspection stations to the post-inspection station and to lift the target object to avoid the inspectors through automatic operation or under the drive of the module transfer arm;

the number of the inspection stations is at least eight, the inspection stations are evenly distributed at both sides of the module transfer arm, the robotic arm is configured to transfer the target object from the inspection stations to the post-inspection station, and each of the inspection stations is corresponding to one inspector; and the frame is provided with an electric cabinet configured to control the module transfer arm and movements of robotic arms.

The present application further provides a transfer method, and the transfer method comprises:

placing a target object to a pre-inspection station, picking up the target object to avoid inspectors and placing the target object on an inspection station;

inspecting the target object placed on the inspection station; and picking up the target object after the inspection to avoid the inspectors and placing the target object to a post-inspection station.

In one embodiment, the step of placing the target object on the pre-inspection station further comprises:

picking up or turning the target object after the inspection by the discharge mechanism such that a height of the target object is greater than a height of an inspector, and transferring the target object to the post-inspection station.

In one embodiment, the step of inspecting the target object placed on the inspection station further comprises:

conducting inspection of the target object at a preceding inspection station, and then placing the target object, which has completed the inspection at the preceding inspection station, onto a subsequent inspection station, when the number of the inspection station is greater than one and if continuous inspection at different stations is required.

In one embodiment, the step of inspecting the target object placed on the inspection station further comprises:

finishing the inspection of the target object through one-pass, then transferring the target object to the post-inspection station, when the inspection station is utilized as a one-pass inspection platform.

In the transfer device of the present application, the target object on the pre-inspected station is clamped and transferred to the inspection station by the feed mechanism on the module transfer arm, after the inspection, the target object is clamped and transferred to the post-inspection station by the discharge mechanism, and thereafter transferred from the post-inspection station to a subsequent process. The inspection station is arranged on the conveying direction of the module transfer arm, it is only required to lift the target object to avoid the inspectors during the inspection before the target object is transferred to a subsequent station, it is not necessary to move the target object outside the conveying direction, which therefore saves the conveying time, improves the inspection efficiency, makes the device more compact, reduces the width of the device, saves the occupied space thereof, and facilitates the arrangement of the transfer device within a plant area, in the meantime greatly reduces the production cost, and improves the work efficiency.

In the transfer method of the present application, the target object on the pre-inspected station is clamped and transferred to the inspection station by the feed mechanism on the module transfer arm, after the inspection, the target object is clamped and transferred to the post-inspection station by the discharge mechanism, and thereafter transferred from the post-inspection station to a subsequent process. The inspection is directly performed on the inspection station, during which, it is only required to lift the target object to avoid the inspectors and then transfer the target object to a subsequent station, and it is not necessary to move the target object outside the conveying direction, which makes the operation simple, saves the conveying time, improves the inspection efficiency, reduces the width of the device, saves the occupied space thereof, and facilitates the arrangement of the transfer device within a plant area, and in the meanwhile saves the production cost and improves the work efficiency.

DESCRIPTION OF THE PREFERRED EMBODIMENTS

Figure 1:
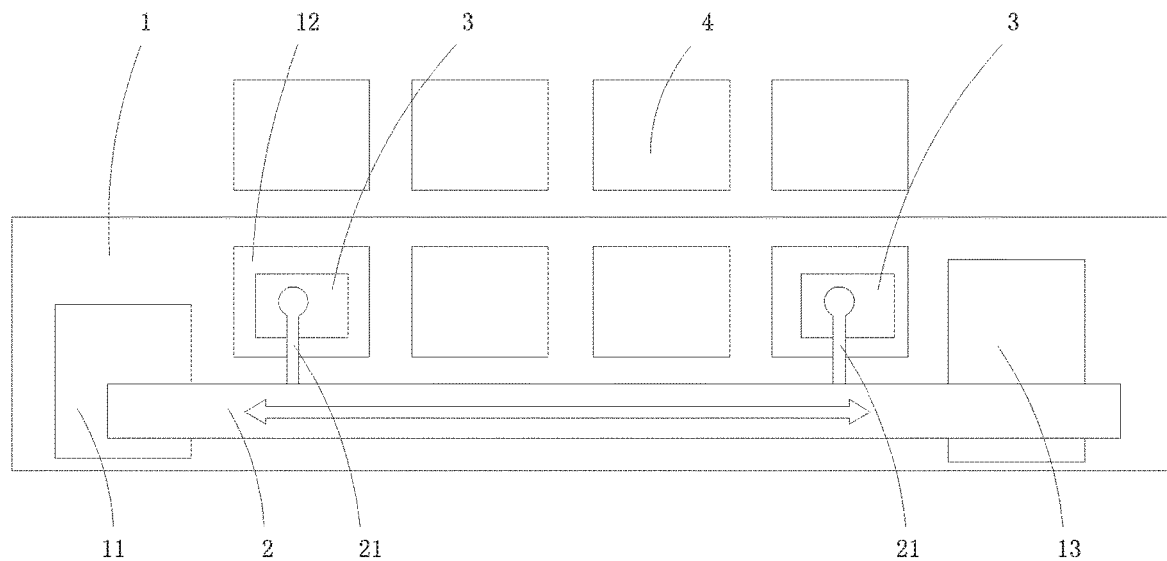
FIG. 1 is a schematic structural diagram of a transfer device according to a first embodiment of the present application.

In order to make the technical problems to be solved, technical solutions, and beneficial effects of the present application more clear, the present application will be further described in detail hereinbelow with reference to the accompanying drawings and embodiments. It should be understood that the specific embodiments described herein are merely intended to explain the application rather than to limit the present application.

It should be noted that when an element is referred to as being "fixed" or "arranged" at/in/on another element, it can be directly at/in/on the other element. When an element is referred to as being "connected" to/with another element, it can be directly or indirectly connected to/with the other element.

It should be understood that terms "length", "width", "upper", "lower", "front", "rear", "left", "right", "vertical", "horizontal", "top", "bottom", "inside", "outside" and the like indicating orientation or positional relationship are based on the orientation or the positional relationship shown in the drawings, and are merely for facilitating and simplifying the description of the present application, rather than indicating or implying that a device or component must have a particular orientation, or be configured or operated in a particular orientation, and thus should not be construed as limiting the application.

Moreover, the terms "first" and "second" are adopted for descriptive purposes only and are not to be construed as indicating or implying a relative importance or implicitly indicating the number of technical features indicated. Thus, features defining "first" and "second" may include one or more of the features either explicitly or implicitly. In the description of the present application, the meaning of "a plurality of" or "multiple" is two or more unless otherwise specifically defined.

Figure 2:
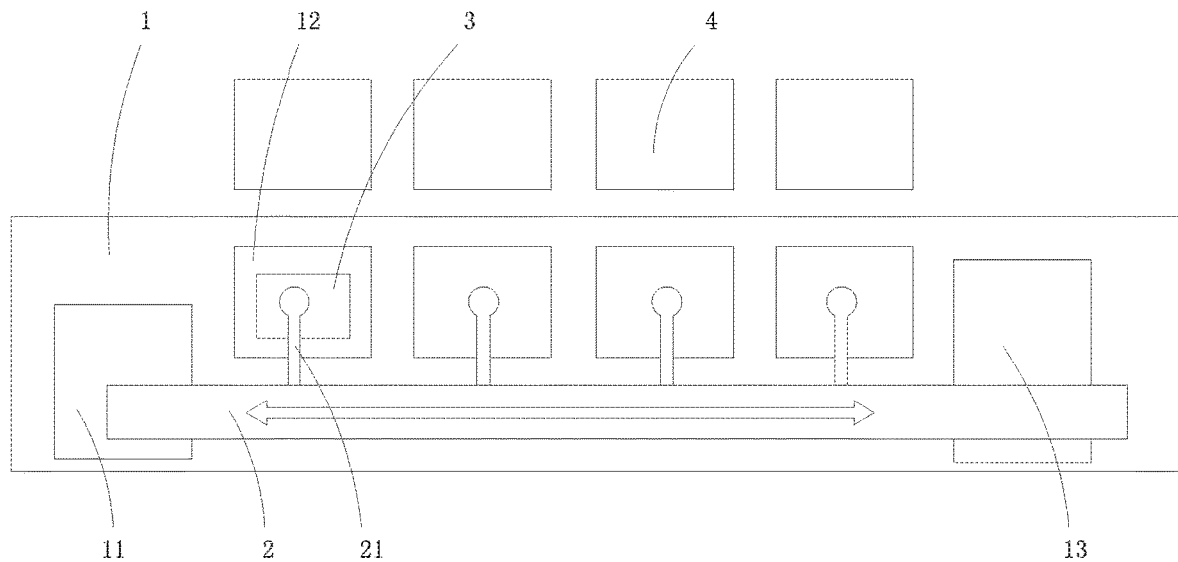
FIG. 2 is a schematic structural diagram of a transfer device according to a second embodiment of the present application.
Figure 3:
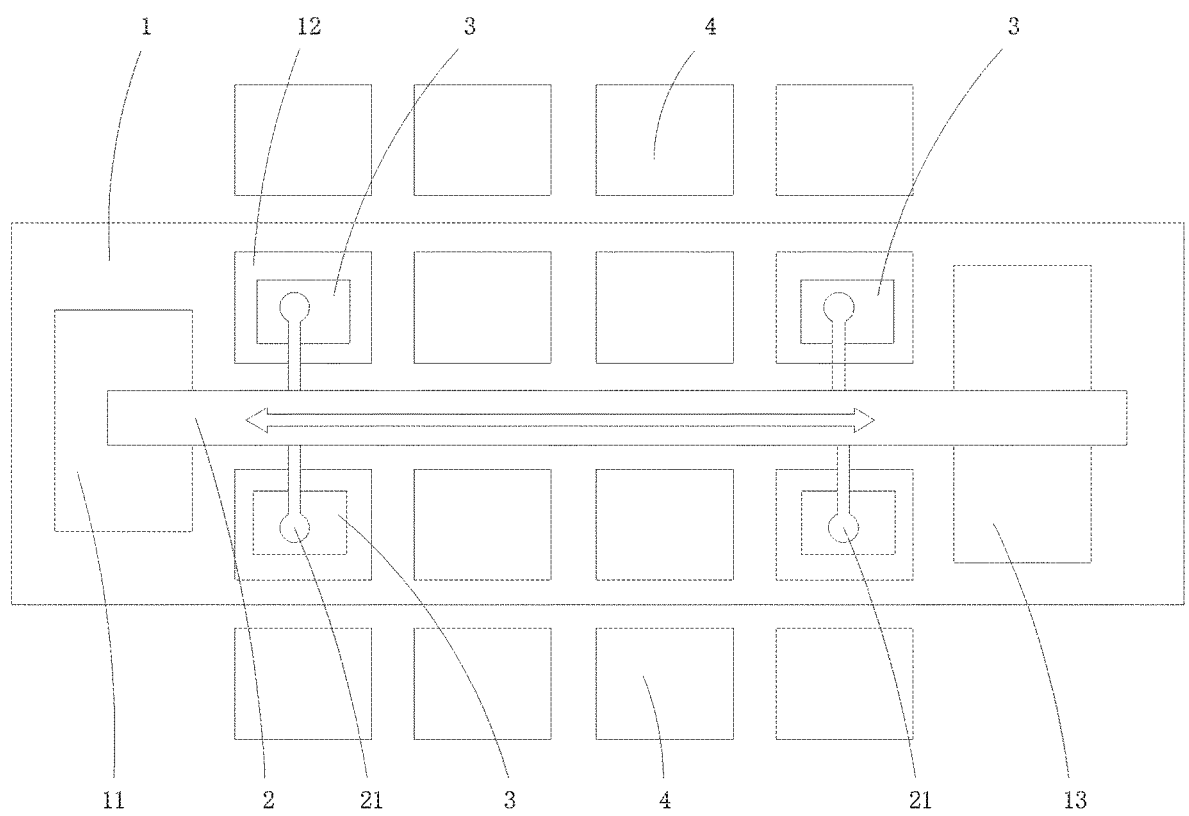
FIG. 3 is a schematic structural diagram of a transfer device according to a third embodiment of the present application.
Figure 4:
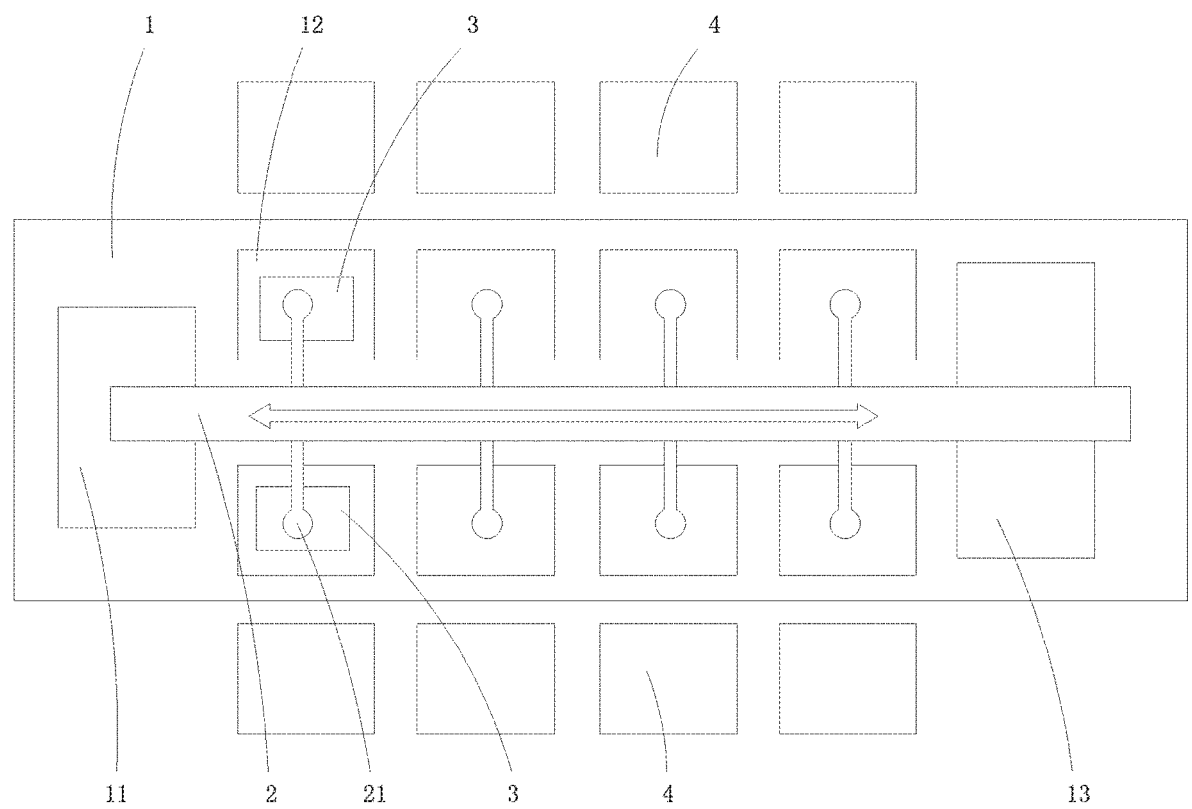
FIG. 4 is a schematic structural diagram of a transfer device according to a fourth embodiment of the present application.

Referring to FIGS. 1-2, a transfer device provided by the present application is described hereinbelow. The transfer device comprises:

a frame 1;

a module transfer arm 2, arranged above the frame 1 and with a number of at least one set;

a pre-inspection station 11, arranged on the frame 1 and at an initial placement position in a conveying direction of the module transfer arm 2, and configured to place a target object 3 to be inspected;

a post-inspection station 13, arranged on the frame 1 at a finish-placement position in the conveying direction of the module transfer arm 2, and configured to place the target object 3 after being inspected;

an inspection station 12, arranged on the frame 1 and between the pre-inspection station 11 and the post-inspection station 13, and configured to place thereon and inspect the target object 3;

a feed mechanism, in connection with the module transfer arm 2, and configured to transfer the target object 3 from the pre-inspection station 11 to the inspection station 12 and to lift the target object 3 to avoid inspectors 4 through automatic operation or under the drive of the module transfer arm 2; and a discharge mechanism, in connection with the module transfer arm 2, and configured to transfer the target object 3 from the inspection station 12 to the post-inspection station 13 and to lift the target object 3 to avoid the inspectors 4 through automatic operation or under the drive of the module transfer arm 2.

In the transfer device, the target object 3 on the pre-inspected station 11 is clamped and transferred to the inspection station 12 by the feed mechanism on the module transfer arm 2, after the inspection, the target object 3 is clamped and transferred to the post-inspection station 13 by the discharge mechanism, and thereafter transferred from the post-inspection station 13 to a subsequent process. The inspection station 12 is arranged on the conveying direction of the module transfer arm 2, it is only required to lift the target object 3 to avoid the inspectors 4 during the inspection before the target object 3 is transferred to a subsequent station, it is not necessary to move the target object 3 outside the conveying direction, which therefore saves the conveying time, improves the inspection efficiency, makes the device more compact, reduces the width of the device, saves the occupied space thereof, and facilitates the arrangement of the transfer device within a plant area, in the meantime greatly reduces the production cost, and improves the work efficiency. The feed mechanism and the discharge mechanism arranged on the module transfer arm 2 can be driven by the module transfer arm 2, such that the target object is picked up and transferred by robotic arms 21; or alternatively, the module transfer arm 2 is a fixed crossbeam, and the feed mechanism and the discharge mechanism are arranged on the module transfer arm 2 and configured to pick up and then transfer the target object.

In one embodiment, referring to FIGS. 3-6, as an illustrative mode for carrying out the present application, the post-inspection station 13 is located at an end of the module transfer arm, which is convenient for the operation of the discharge mechanism. Optionally, both the discharge mechanism and the feed mechanism share a same rail arranged on the module transfer arm 2, thereby saving the space.

In one embodiment, as an illustrative mode for carrying out the present application, the feed mechanism and the discharge mechanism are both robotic arms 21. One robotic arm 21 is configured to transfer the target object 3 from the pre-inspection station 11 to the inspection station 12, and the other robotic arm 21 is configured to transfer the target object 3 from the inspection station 12 to the post-inspection station 13. The two robotic arms 21 share the same rail, and the picking up and the placing of the target object are separately performed, thus, the efficiency is high, the work is in order, and the space is saved, not only is the volume of the device reduced, but also the control thereof become much convenient. Optionally, a structure configured on the robotic arm for fixing the target object is a plurality of suction cups, which have good absorbing and fixing effect, when the target object is a panel, particularly a panel in a display device, and would not damage the panel.

In one embodiment, referring to FIGS. 3-6, as an illustrative mode for carrying out the present application, the post-inspection station 13 is located at two sides of the module transfer arm 2, the post-inspection station 13 is located at one side or two sides of the module transfer arm 2. When the robotic arms 21 are located at a single side of the module transfer arm 2, one set of conveying passage is provided, the space occupied by the device is small, and when the post-inspection station 13 is located at the two sides of the module transfer arm 2, another set of conveying passage is additionally provided, which enables the inspectors 4 to inspect at one side of each of the conveying passage, thereby fully utilizing the space.

In one embodiment, as an illustrative mode for carrying out the present application, the number of the inspection station 12 is at least one. The number of the inspection station 12 can be set according to the practical inspection requirement for different inspection object.

In one embodiment, referring to FIGS. 3-6, as an illustrative mode for carrying out the present application, the number of the inspection station 12 is at least eight and all the inspection stations 12 are located at the two sides of the module transfer arm 2. When the target object 3 to be inspected is a display module, four inspection stations 12 can be sequentially arranged on each of the two sides of the module transfer arm 2, the display module is inspected by the inspectors by the side of the inspection stations 12, and the inspection can be performed without moving the display module outside the conveying direction, thus shortening the waiting time of the inspectors, improving the production efficiency, reducing the width of the transfer device, simplifying the moving mechanisms of the device, saving the production cost, and enabling the production line to have a space for a moving line. The inspection station 12 can be utilized as a one-pass inspection platform, or utilized as a continuous inspection platform. When the inspection station 12 is utilized as the one-pass inspection platform, the target object only requires one-pass inspection platform and is then transferred to the post-inspection station 13 by the robotic arm 21; and when the inspection station 12 is utilized as a continuous inspection platform, the inspection object can be moved by the robotic arm 21 among the inspection stations 12 for sequential inspection, and then transferred to the post-inspection station 13 by robotic arm 21.

Figure 5:
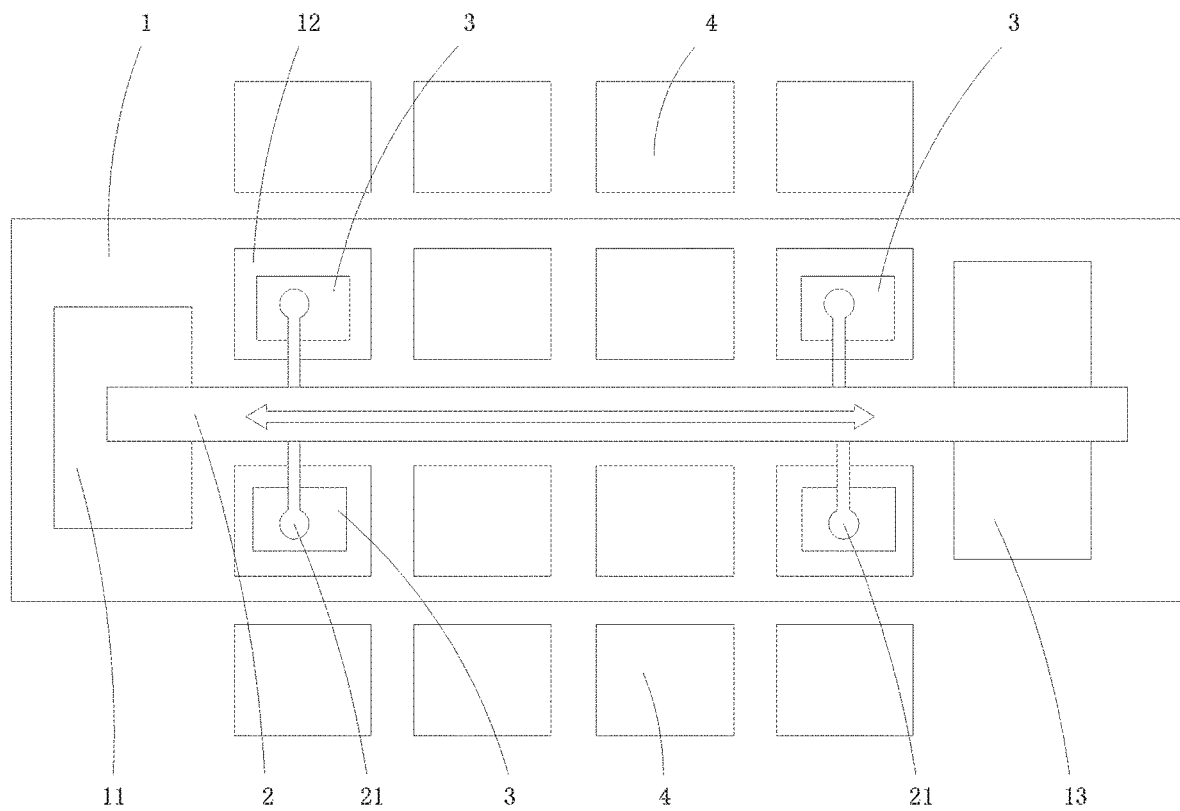
FIG. 5 is a schematic structural diagram of a transfer device according to a fifth embodiment of the present application.
Figure 6:
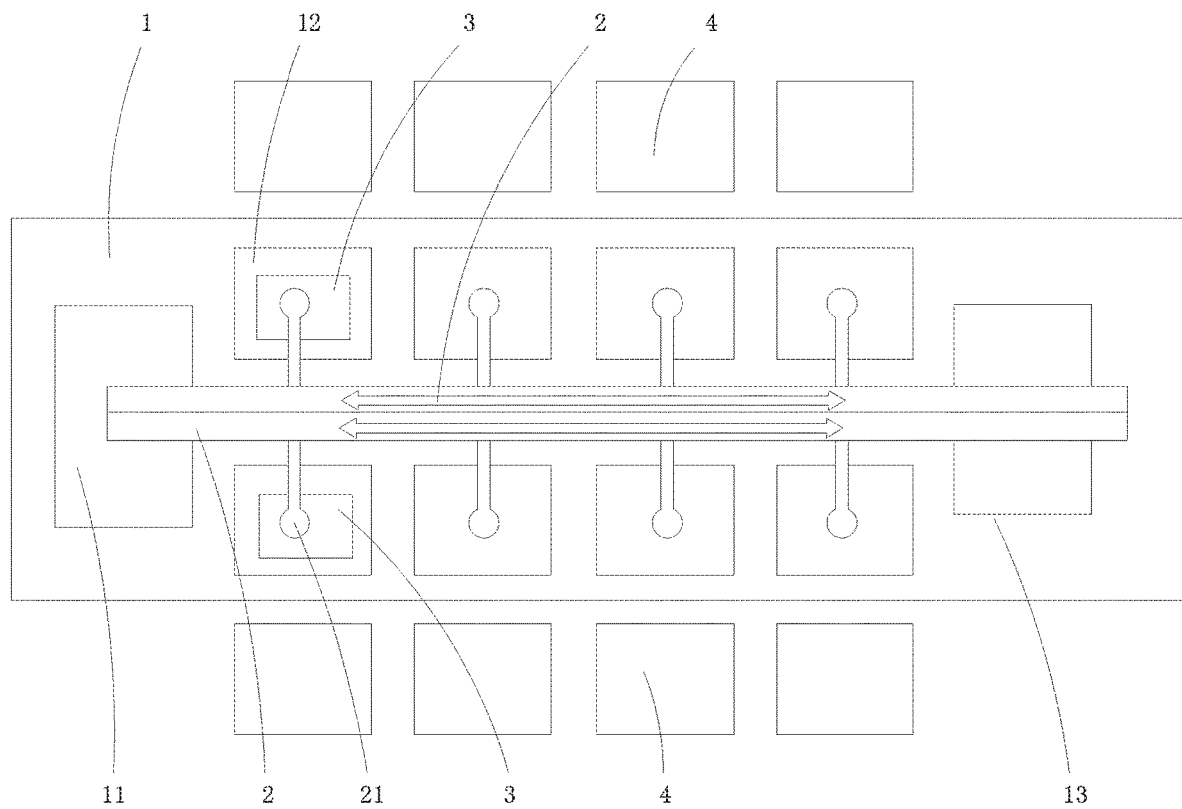
FIG. 6 is a schematic structural diagram of a transfer device according to a sixth embodiment of the present application.

In one embodiment, referring to FIGS. 5-6, as an illustrative mode for carrying out the present application, the number of the module transfer arm 2 is two, and the two module transfer arms 2 are juxtaposed, the robotic arms 21 are arranged on the two module transfer arms 2 with equal numbers or in a symmetrical manner. When the number of the module transfer arms 2 is two, the two conveying passages can be independently controlled, and different products can be conveyed and inspected, thus not affecting the operation of the two module transfer arms from each other.

In one embodiment, as an illustrative mode for carrying out the present application, the robotic arm 21 is provided with an anti-collision inspection member. By setting the anti-collision inspection member, the robotic arm 21 is enabled to avoid the inspectors 4 or be powered off to ensure the safety of both the inspectors 4 and the device.

In one embodiment, as an illustrative mode for carrying out the present application, the anti-collision inspection member is a distance inspection sensor. By setting the distance inspection sensor, a distance between an obstacle and the robotic arm 21 can be inspected, and a pre-judgment can be made, alarming, avoiding, or power off of the robotic arm 21 would be triggered after a set safe distance is reached.

In one embodiment, as an illustrative mode for carrying out the present application, the robotic arm 21 is provided with a holder configured to hold the target object 3. The setting of the holder ensures the fixing stability of the target object 3, thus being apt to transfer.

In one embodiment, as an illustrative mode for carrying out the present application, the holder is suction cups.

In one embodiment, as an illustrative mode for carrying out the present application, the suction cups are fixed to the robotic arm 21 via a fixing bracket. Multiple suction cups can be arranged on the robotic arm 21 to ensure the fixing effect.

In one embodiment, as an illustrative mode for carrying out the present application, the suction cups are uniformly arranged on the fixing bracket. Thus, the target object 3 is ensured to uniformly bear a force, and the fixation is much stable.

In one embodiment, as an illustrative mode for carrying out the present application, the transfer device further comprises a suction device configured to be in communication with the suction cups. The suction device facilitates the generation of a negative pressure, thereby absorbing and fixing the target object 3.

In one embodiment, as an illustrative mode for carrying out the present application, the suction device is a vacuum pump, which is convenient to generate the negative pressure thereby absorbing and fixing the target object 3.

In one embodiment, as an illustrative mode for carrying out the present application, the vacuum pump and the suction cups are connected by a pipeline. The connection between the vacuum pump and the suction cups through the pipelines enables the same vacuum pump to connect to the multiple suction cups, which saves the space and the cost.

In one embodiment, as an illustrative mode for carrying out the present application, the pipeline comprises hoses. The hoses are polyurethane (PU) hose, which feature chemical corrosion resistance, light weight, high wear resistance, anti-staining, anti-flatulence and other properties. Optionally, the hoses are helical and have a certain amount of expansion and contraction.

Referring to FIGS. 1-2, a transfer device provided by the present application is described hereinbelow. The transfer device comprises:

a frame 1;

the frame 1 being configured to be placed on the ground;

a module transfer arm 2, arranged above the frame 1 and with a number of at least one set;

a pre-inspection station 11, arranged on the frame 1 and at an initial placement position in a conveying direction of the module transfer arm 2, and configured to place a target object 3 to be inspected;

a post-inspection station 13, arranged on the frame 1 at a finish-placement position in the conveying direction of the module transfer arm 2, and configured to place the target object 3 after being inspected;

inspection stations 12, arranged on the frame 1 and between the pre-inspection station 11 and the post-inspection station 13, and configured to place thereon and inspect the target object 3;

a feed mechanism, in connection with the module transfer arm 2, and configured to transfer the target object 3 from the pre-inspection station 11 to one of the inspection stations 12 and to lift the target object 3 to avoid inspectors 4 through automatic operation or under the drive of the module transfer arm 2; and a discharge mechanism, in connection with the module transfer arm 2, sharing with the feed mechanism a same rail arranged on the module transfer arm 2, and configured to transfer the target object 3 from one of the inspection stations 12 to the post-inspection station 13 and to lift the target object 3 to avoid the inspectors 4 through automatic operation or under the drive of the module transfer arm 2;

the number of the inspection stations 12 is at least eight, the inspection stations 12 are arranged at two sides of the module transfer arm 2 with an equal number, and each of the inspection stations 12 is corresponding to one inspector 4; and the frame 1 is provided with an electric cabinet configured to control the module transfer arm 2 and movements of robotic arms 21.

In the transfer device, the target object 3 on the pre-inspected station 11 is clamped and transferred to the inspection station 12 by the feed mechanism on the module transfer arm 2, after the inspection, the target object 3 is clamped and transferred to the post-inspection station 13 by the discharge mechanism, and thereafter transferred from the post-inspection station 13 to a subsequent process. The inspection stations 12 are arranged on the conveying direction of the module transfer arm 2, it is not necessary to move the target object 3 outside the conveying direction, which therefore saves the conveying time, improves the inspection efficiency. By setting four inspection stations 12 at each of the two sides of the module transfer arm 2, one module transfer arm 2 with a double-passage transferring structure is realized; and by controlling the feed mechanism and the discharge mechanism via the electric cabinet, the display modules are inspected by the inspectors 4 by the side of the inspection stations 12, and the inspection can be performed without moving the display modules out of the conveying direction, which shortens the waiting time of the inspectors, improves the production efficiency, reduces the width of the transfer device, saves the occupied space thereof, facilitates the arrangement of the transfer device within a plant area, saves the production cost, and enables the production line to have space for movable lines.

The present application further provides a transfer method, the transfer method comprises:

placing a target object 3 on a pre-inspection station 11, regulating a position of a feed mechanism, and enabling the feed mechanism to pick up the target object 3 to avoid inspectors 4 and place the target object 3 on an inspection station 12;

inspecting the target object 3 placed on the inspection station 12; and regulating a position of a discharge mechanism after the inspection, enabling the discharge mechanism to pick up the target object 3 after the inspection to avoid the inspectors 4 and place the target object 3 on a post-inspection station 13.

In the transfer method, the target object 3 on the pre-inspected station 11 is clamped and transferred to the inspection station 12 by the feed mechanism on the module transfer arm 2, after the inspection, the target object 3 is clamped and transferred to the post-inspection station 13 by the discharge mechanism, and thereafter transferred from the post-inspection station 13 to a subsequent process. The inspection is directly performed on the inspection station 12, during which, it is only required to lift the target object 3 to avoid the inspectors 4 and then transfer the target object 3 to a subsequent station, and it is not necessary to move the target object 3 outside the conveying direction, which makes the operation simple, saves the conveying time, improves the inspection efficiency, reduces the width of the device, saves the occupied space thereof, and facilitates the arrangement of the transfer device within a plant area, and in the meanwhile saves the production cost and improves the work efficiency.

In one embodiment, as a specific mode for carrying out the transfer method provided by the present application, the step of placing the target object 3 on the pre-inspection station 11 further comprises:

enabling a height of the target object 3 to be greater than a height of an inspector when the target object 3 after the inspection is picked up or rotated by the discharge mechanism, and transferring the target object 3 to the post-inspection station. By lifting or rotating the target object 3 to avoid the inspector, the work safety of the inspector is ensured. When the target object is a panel, the panel is absorbed and fixed by the suction cups of the robotic arm, and then rotated upwards for 180°, in this way, the panel can be quickly lifted, and the work efficiency is high.

In one embodiment, as a specific mode for carrying out the transfer method provided by the present application, the discharge mechanism and the feed mechanism are both robotic arms 21. The discharge mechanism and the feed mechanism can be separate robotic arms 21. The two robotic arms 21 share the same rail, and the picking up and the placing of the target object are separately performed, thus, the efficiency is high, the work is in order, and the space is saved, not only is the volume of the device reduced, but also the control thereof become much convenient. Also, the discharge mechanism and the feed mechanism can be the same robotic arm 21.

In one embodiment, as a specific mode for carrying out the transfer method provided by the present application, the step of inspecting the target object 3 placed on the inspection station 12 further comprises: in the case that the number of the inspection station 12 is greater than one and if it is required to conduct continuous inspection at different stations, after the inspection of the target object 3 is completed at a preceding inspection station 12, a robotic arm 21 may be set or additionally set to pick up the target object 3 after the inspection at the preceding inspection station 12 and to place the target object 3 onto a subsequent inspection station 2. The number of the inspection stations can be set according to practical requirement of different inspection objects, and the target object 3 is sequentially transferred among the inspection stations 12 on the same side of the module transfer arm 2. The inspection station 12 may be utilized as the one-pass inspection platform, or utilized as a continuous inspection platform. When the inspection station 12 is utilized as the one-pass inspection platform, the target object only requires one-pass inspection platform and is thereafter transferred to the post-inspection station 13 by the robotic arm 21; and when the inspection station 12 is utilized as the continuous inspection platform, the inspection object can be moved by the robotic arm 21 among the inspection stations 12 for sequential inspection, and then transferred to the post-inspection station 13 by robotic arm 21.

In the embodiment, as an illustrative mode for carrying out the present application, when the robotic arms 21 are disposed on two sides of the module transfer arm 2, the transfer and inspection of the target object can be simultaneously performed on the two sides. When the number of the module transfer arm 2 is two, the transfer and inspection of the target object can be performed simultaneously and asynchronously on the two sides.

The above description is only the preferred embodiments of the present application, and is not intended to limit the present application. Any modifications, equivalent substitutions, and improvements made within the spirit and principles of the present application are included in the protection scope of the present application.

What is claimed is:

1. A transfer device, comprising:
    a frame;
    a module transfer arm, arranged above the frame and with a number of at least one;
    a pre-inspection station, arranged on the frame at an initial placement position in a conveying direction of the module transfer arm, and configured to place thereon a target object to be inspected;
    a post-inspection station, arranged on the frame at a finish-placement position in the conveying direction of the module transfer arm, and configured to place thereon the target object after being inspected;
    an inspection station, respectively arranged on the frame and between the pre-inspection station and the post-inspection station, and configured to place thereon and inspect the target object;
    a feed mechanism, in connection with the module transfer arm, and configured to transfer the target object from the pre-inspection station to the inspection station and to lift the target object to avoid inspectors through automatic operation or under the drive of the module transfer arm; and
    a discharge mechanism, in connection with the module transfer arm, and configured to transfer the target object from the inspection station to the post-inspection station and to lift the target object to avoid the inspectors through automatic operation or under the drive of the module transfer arm;
    wherein the discharge mechanism is further configured to:
    pick up or turn the target object after the inspection by the discharge mechanism such that a height of the target object is greater than a height of an inspector, and transfer the target object to the post-inspection station.

2. The transfer device of claim 1, wherein the post-inspection station is located at an end of the module transfer arm.

3. The transfer device of claim 1, wherein the number of the inspection station is at least eight and the inspection stations are evenly distributed at both sides of the module transfer arm.

4. The transfer device of claim 1, wherein the number of the module transfer arm is two, and the two module transfer arms are juxtaposed.

5. The transfer device of claim 1, wherein the feed mechanism and the discharge mechanism are both robotic arms.

6. The transfer device of claim 5, wherein the robotic arm is provided with an anti-collision inspection member.

7. The transfer device of claim 6, wherein the anti-collision inspection member is a distance inspection sensor.

8. The transfer device of claim 5, wherein the robotic arm is provided with a holder configured to hold the target object.

9. The transfer device of claim 8, wherein the holder is suction cups.

10. The transfer device of claim 9, wherein the suction cups are fixed to the robotic arm via a fixing bracket.

11. The transfer device of claim 10, wherein the suction cups are uniformly arranged on the fixing bracket.

12. The transfer device of claim 9, wherein the transfer device further comprises a suction device configured to be in communication with the suction cups.

13. The transfer device of claim 12, wherein the suction device is a vacuum pump.

14. The transfer device of claim 13, wherein the vacuum pump and the suction cups are connected by a pipeline.

15. The transfer device of claim 13, wherein the pipeline comprises hoses.

16. A transfer device, comprising:
a frame;
a module transfer arm, arranged above the frame and with a number of at least one set;
a pre-inspection station, arranged on the frame at an initial placement position in a conveying direction of the module transfer arm, and configured to place thereon a target object to be inspected;
a post-inspection station, arranged on the frame at a finish-placement position in the conveying direction of the module transfer arm, and configured to place thereon the target object after being inspected;
inspection stations, respectively arranged on the frame and between the pre-inspection station and the post-inspection station, and configured to place thereon and inspect the target object;
a feed mechanism, in connection with the module transfer arm, and configured to transfer the target object from the pre-inspection station to one of the inspection stations and to lift the target object to avoid inspectors through automatic operation or under the drive of the module transfer arm; and
a discharge mechanism, in connection with the module transfer arm, and configured to transfer the target object from one of the inspection stations to the post-inspection station and to lift the target object to avoid the inspectors through automatic operation or under the drive of the module transfer arm;
a number of the inspection stations is at least eight, the inspection stations are evenly distributed at both sides of the module transfer arm, and each of the inspection stations is corresponding to one inspector; and
the frame is provided with an electric cabinet configured to control the module transfer arm and movements of robotic arms;
wherein the discharge mechanism is further configured to:
pick up or turn the target object after the inspection by the discharge mechanism such that a height of the target object is greater than a height of an inspector, and transfer the target object to the post-inspection station.

17. A transfer method, comprising:
placing a target object to a pre-inspection station, picking up the target object to avoid inspectors and placing the target object on an inspection station;
inspecting the target object placed on the inspection station; and
picking up the target object after the inspection to avoid the inspectors and placing the target object to a post-inspection station;
wherein the step of placing the target object to a post-inspection station further comprises:
picking up or turning the target object after the inspection by a discharge mechanism such that a height of the target object is greater than a height of an inspector, and transferring the target object to the post-inspection station.

18. The transfer method of claim 17, wherein the step of inspecting the target object placed on the inspection station further comprises:
conducting inspection of the target object at a preceding inspection station, and then placing the target object, which has completed the inspection at the preceding inspection station, onto a subsequent inspection station, when the number of the inspection station is greater than one and if continuous inspection at different stations is required.

19. The transfer method of claim 17, wherein the step of inspecting the target object placed on the inspection station further comprises:
finishing the inspection of the target object through one-pass, then transferring the target object to the post-inspection station, when the inspection station is utilized as a one-pass inspection platform.

\* \* \* \* \*